(12) United States Patent
Salter et al.

(10) Patent No.: US 11,047,541 B2
(45) Date of Patent: Jun. 29, 2021

(54) VEHICULAR LIGHTING ASSEMBLIES WITH INVISIBLE FLUTED REGIONS AND METHODS OF MAKING THE SAME

(71) Applicant: Ford Global Technologies, LLC, Dearborn, MI (US)

(72) Inventors: Stuart C. Salter, White Lake, MI (US); Aaron Bradley Johnson, Allen Park, MI (US); Paul Kenneth Dellock, Northville, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/589,223

(22) Filed: Oct. 1, 2019

(65) Prior Publication Data
US 2020/0032975 A1 Jan. 30, 2020

Related U.S. Application Data

(62) Division of application No. 15/211,176, filed on Jul. 15, 2016, now Pat. No. 10,488,006.

(51) Int. Cl.
*F21S 41/20* (2018.01)
*F21S 43/31* (2018.01)
(Continued)

(52) U.S. Cl.
CPC ............ *F21S 41/285* (2018.01); *F21S 41/28* (2018.01); *F21S 41/321* (2018.01); *F21S 43/26* (2018.01); *F21S 43/31* (2018.01)

(58) Field of Classification Search
None
See application file for complete search history.

(56) References Cited

U.S. PATENT DOCUMENTS

| | | |
|---|---|---|
| 2,063,207 A | 12/1936 | Taylor |
| 2,890,627 A | 6/1959 | Onksen |
| (Continued) | | |

FOREIGN PATENT DOCUMENTS

| | | |
|---|---|---|
| CN | 1320088 A | 10/2001 |
| CN | 1590835 A | 3/2005 |
| (Continued) | | |

OTHER PUBLICATIONS

China National Intellectual Property Administration, First Office Action, Chinese Patent Application No. 201710556481.8, dated Oct. 10, 2020, 10 pages.

*Primary Examiner* — Mary Ellen Bowman
(74) *Attorney, Agent, or Firm* — David Coppiellie; Price Heneveld LLP

(57) ABSTRACT

A vehicular lighting assembly (and methods of making the same) that includes a parabolic reflector; a translucent lens element; and a light source configured to emanate light that strikes an interior surface of the reflector and exits the assembly through the element. Further, an interior surface of the lens element comprises one or more fluted regions that are substantially invisible and configured to refract light from the source away from oncoming vehicles. In addition, the fluted region can be within, on, or integral with, the interior and/or exterior surfaces of the lens element in certain configurations.

20 Claims, 4 Drawing Sheets

(51) Int. Cl.
*F21S 41/32* (2018.01)
*F21S 43/20* (2018.01)

(56) References Cited

U.S. PATENT DOCUMENTS

| | | | |
|---|---|---|---|
| 4,261,031 A | 4/1981 | Fratty | |
| 4,446,511 A * | 5/1984 | Sands | F21S 41/28 362/267 |
| 5,034,867 A | 7/1991 | Mayer | |
| 5,612,102 A | 3/1997 | Nakama | |
| 5,703,667 A | 12/1997 | Ochiai | |
| 5,779,341 A | 7/1998 | Chinniah | |
| 6,285,472 B1 | 9/2001 | Odhner | |
| D462,032 S | 8/2002 | Schmauz-Grimsel | |
| 6,525,111 B1 | 2/2003 | Spencer | |
| 7,207,700 B2 | 4/2007 | Fallahi | |
| 8,033,136 B2 | 10/2011 | Maltezos | |
| 8,314,989 B1 | 11/2012 | Mossberg | |
| 8,619,363 B1 | 12/2013 | Coleman | |
| 10,488,006 B2 * | 11/2019 | Salter | F21S 41/285 |
| 2001/0040810 A1 | 11/2001 | Kusagaya | |
| 2002/0080622 A1 | 6/2002 | Pashley | |
| 2003/0189838 A1 * | 10/2003 | Schottland | F21S 41/28 362/509 |
| 2004/0119174 A1 * | 6/2004 | Hofmann | B29D 11/00432 264/1.32 |
| 2006/0061153 A1 | 3/2006 | Hamamoto | |
| 2006/0158888 A1 | 7/2006 | Wang | |
| 2009/0050454 A1 | 2/2009 | Matsukawa | |
| 2010/0202154 A1 | 8/2010 | Hamkens | |
| 2011/0037243 A1 | 2/2011 | Laframboise | |
| 2014/0009838 A1 | 1/2014 | Weber | |
| 2015/0371570 A1 | 12/2015 | Sciackitano | |
| 2016/0011342 A1 * | 1/2016 | Griffin | G03B 21/62 359/459 |
| 2016/0107371 A1 | 4/2016 | Hurme | |
| 2016/0231493 A1 | 8/2016 | Lordache | |
| 2016/0273721 A1 | 9/2016 | Pijlman | |
| 2017/0080784 A1 | 3/2017 | Kobayashi | |
| 2017/0297507 A1 | 10/2017 | Dellock | |
| 2017/0297508 A1 | 10/2017 | Dellock | |
| 2018/0111570 A1 | 4/2018 | Dellock | |

FOREIGN PATENT DOCUMENTS

| | | | |
|---|---|---|---|
| CN | 105627219 A | 6/2016 | |
| GB | 292167 A | 6/1927 | |
| WO | WO 2005/032757 A1 * | 9/2004 | B23K 26/03 |

* cited by examiner

VEHICULAR LIGHTING ASSEMBLIES WITH INVISIBLE FLUTED REGIONS AND METHODS OF MAKING THE SAME

CROSS REFERENCE TO RELATED APPLICATIONS

This application is a divisional application that claims priority to and the benefit under 35 U.S.C. § 121 of U.S. patent application Ser. No. 15/211,176, filed on Jul. 15, 2016, entitled "VEHICULAR LIGHTING ASSEMBLIES WITH INVISIBLE FLUTED REGIONS AND METHODS OF MAKING THE SAME," the entire disclosure of which is incorporated by reference herein.

FIELD OF THE INVENTION

The present invention generally relates to vehicular lighting assemblies and methods of making the same, particularly headlamp assemblies with invisible and substantially invisible fluted regions.

BACKGROUND OF THE INVENTION

As more efficient lighting source technologies, such as light emitting diode (LED) technologies, are being incorporated into headlamps and other vehicular lighting assemblies, the need for refracting and re-aiming light to regulated visibility zones, and diffusing and obscuring light from oncoming vehicles and pedestrians is increasing. Further, with advancements in LED lighting technologies combined with condenser lenses and other optics, non-metallic components of vehicular lighting assemblies, and those in proximity to them, can also suffer damage from sunlight entering these assemblies that reflects and refracts onto such components. Further, many of these new lighting technologies produce light patterns that can be characterized as more directional with higher intensities than earlier technologies. In addition, the increasing population of older drivers increases the importance of night-time driving safety.

Modern vehicle headlamps often incorporate lines, stripes and patterns known to those in the field as optical flutes on portions of the lens. These fluted lines, stripes and patterns on the lens of headlamps and other vehicular lighting assemblies are configured to re-direct light to regulated, geometric visibility zones, re-aim light to prevent glare toward oncoming traffic and/or change direction of incoming sunlight to prevent solar light damage to vehicular lighting components and those in proximity to them. While the size of these fluted portions relative to the overall size of the headlamps is fairly small, these portions are readily visible on many vehicular headlamps.

Car enthusiasts and owners of luxury and high-end vehicles are continually demanding new aesthetics that justify, at least in part, the high cost of such vehicles. While conventional headlamp assemblies with patterned portions for obscuring light from oncoming vehicles serve a valuable safety function on luxury and high-end vehicles, these portions also are not aesthetically pleasing to many owners of these vehicles. In some cases, these patterned portions on the lens surfaces of headlamps of luxury and high-end vehicles may be viewed as defects or other craftsmanship-related problems with the headlamps.

Accordingly, there is a need for vehicular lighting assemblies with invisible, fluted portions or regions on the lens for re-directing light to regulated, geometric visibility zones, re-aiming light to prevent glare toward oncoming vehicles and changing the direction of incoming light to prevent solar damage. There is also a need for methods of making such assemblies.

SUMMARY OF THE INVENTION

According to one aspect of the present invention, a method of making a vehicular lighting lens element is provided that includes: forming mold surfaces corresponding to an interior surface of the vehicular lighting lens element; ablating one of the mold surfaces to form a fluted region mold surface corresponding to a fluted region of the element; and forming the element by dispensing polymeric material into the mold surfaces. The element comprises a substantially invisible fluted region comprising a plurality of flutes with a thickness from 250 to 1000 nm and a period from 0.05 to 5 microns configured to refract light from a light source away from oncoming vehicles.

According to another aspect of the present invention, a method of making a vehicular lighting lens element is provided that includes: forming mold surfaces corresponding to an interior surface of the vehicular lighting lens element; ablating one of the mold surfaces to form a fluted region mold surface corresponding to a fluted region of the element; and forming the element by dispensing polymeric material into the mold surfaces. The element comprises a plurality of integral and substantially invisible flutes having a thickness from 250 to 1000 nm and a period from 50 nm to 5 microns, and configured to refract light from the source away from oncoming vehicles.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
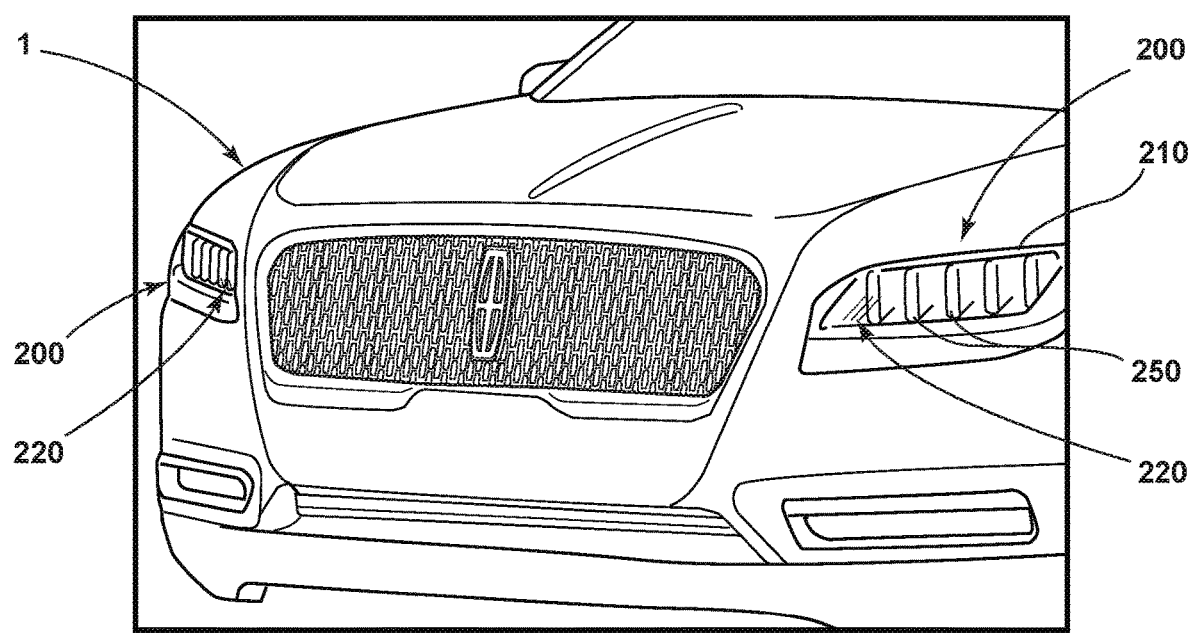
FIG. 1 is a front perspective view of a vehicle with headlamp assemblies configured with visible fluted regions.

For purposes of description herein, the terms "upper," "lower," "right," "left," "rear," "front," "vertical," "horizontal," "interior," "exterior," "vehicle forward," "vehicle rearward," and derivatives thereof shall relate to the invention as oriented in FIG. 1. However, the invention may assume various alternative orientations, except where expressly specified to the contrary.

Also, the specific devices and assemblies illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a pair of conventional headlamp assemblies 200 with light sources 250 is depicted on a vehicle 1 in a front, perspective view. As shown, these conventional headlamp assemblies 200 include fluted regions 220. The fluted regions 220 are configured on the interior surface of the lens element 210 and function to aim light from light sources 250 toward regulated, geometric visibility zones, reduce focus of solar light entering the assemblies 200 on to other components within or in proximity to the assemblies, and/or prevent glare from light sources 250 toward oncoming traffic. In these conventional headlamp assemblies 200, the fluted regions 220 typically comprise strips of a few millimeters in width and a few centimeters in length. Accordingly, the fluted regions 220 are visible from the exterior of the vehicle 1.

Many observers consider these fluted regions 220 as unsightly when these conventional headlamp assemblies 200 are employed in various vehicles, including luxury and high-end vehicles.

Described in the disclosure are various vehicular lighting assemblies with invisible and substantially invisible fluted regions for obscuring light and glare from oncoming vehicles and pedestrians, re-directing light from these assemblies toward regulated, geometric visibility zones and/or de-focusing solar light entering such lighting assemblies to prevent solar-related damage to components within or in proximity to such assemblies. These vehicular lighting assemblies include but are not limited to low-beam headlamps, high-beam headlamps, turn signal assemblies and parking lamp assemblies. The "regulated, geometric visibility zones" for these types of vehicular lighting assemblies include those identified within U.S. Federal Motor Vehicle Safety Standard 108 ("FMVSS 108") and United Nations Economic Commission for Europe Regulation No. 48 ("ECE 48"), both of which are hereby incorporated by reference within this disclosure. Various microscopic features can be added or adjusted within the fluted regions of the vehicular lighting assemblies of this disclosure for adjusting their light aim to achieve the foregoing functions. Further, the fluted regions can be configured to be integral within the lens elements or as discrete layers on the lens elements of these assemblies. Further, methods for making these vehicular lighting assemblies are also detailed in the disclosure.

Figure 2:
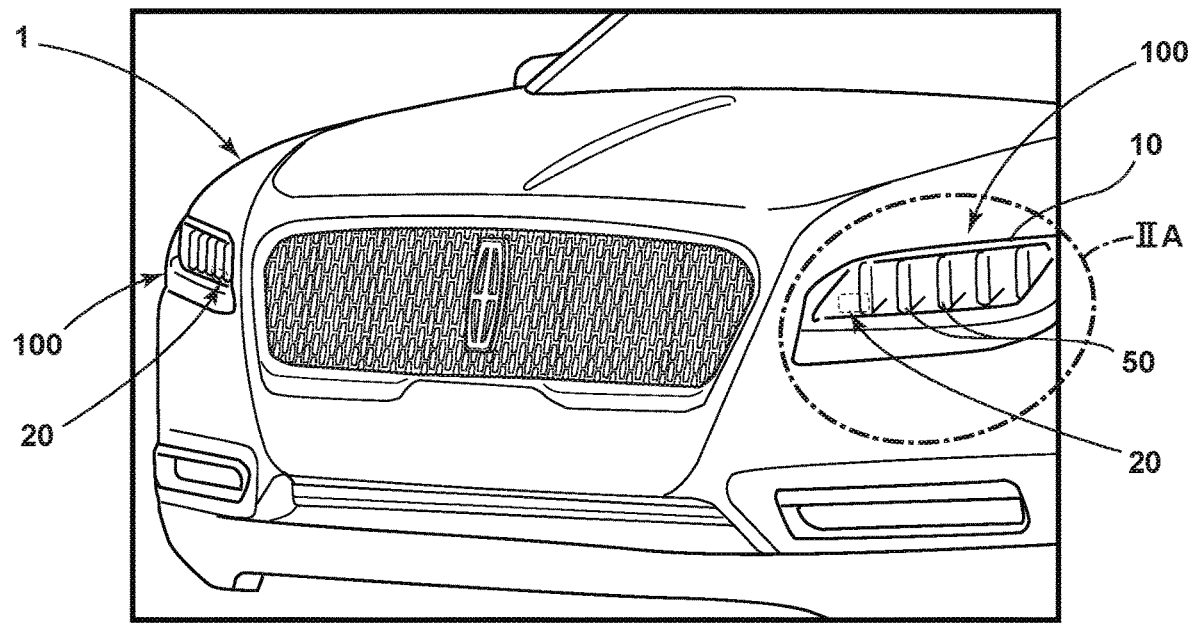
FIG. 2 is a front perspective view of a vehicle with headlamp assemblies configured with substantially invisible fluted regions according to an aspect of the disclosure.
Figure 2A:
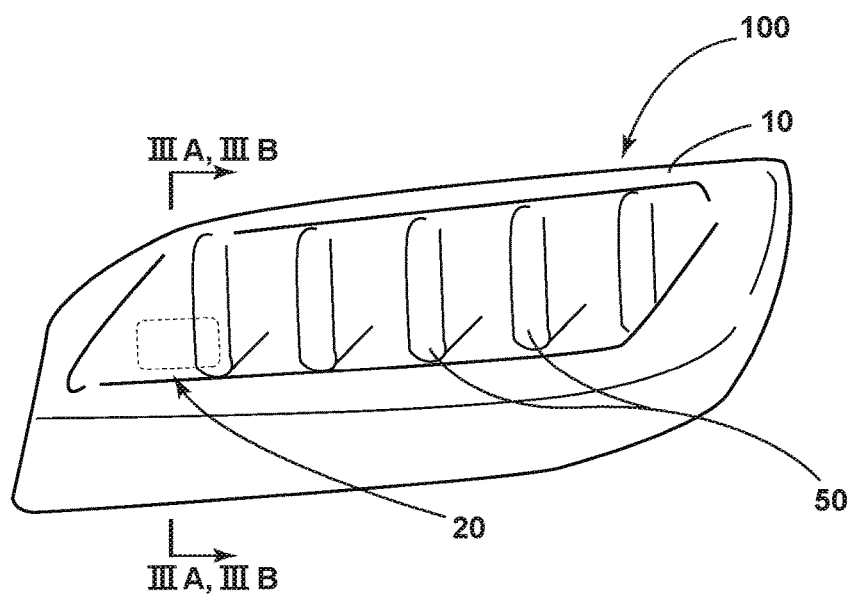
FIG. 2A is an enlarged, front perspective view of one of the headlamp assemblies depicted in FIG. 2.

Referring to FIGS. 2 and 2A, a headlamp assembly 100 affixed to the front of a vehicle 1 is depicted in a front, perspective view according to an aspect of the disclosure. As depicted, each headlamp assembly 100 is configured with one or more light sources 50 within a translucent lens element 10. The light sources 50 are configured to emanate light that exits the assembly 100 through the lens element 10, typically in a low-beam, high-beam or turn signal light pattern. In certain embodiments, the light sources 50 include light-emitting diode (LED), incandescent, halogen or other light source technologies. In certain implementations, the lens element includes one or more near-field lens (NFLs) elements, each with similar or distinct focal points. These NFLs can be configured to produce various light patterns, including those associated with vehicular low-beam, high-beam, parking and turn signal light patterns. The lens element 10 of each of these headlamp assemblies 100 also includes a fluted region 20 that obscures or otherwise refracts light from the light sources 50 away from vehicles that are oncoming relative to the vehicle 1 containing the assemblies 100. Advantageously, the fluted regions 20 within or on the lens element 10 are invisible or substantially invisible from a vantage point outside of the vehicle 1.

Figure 3A:
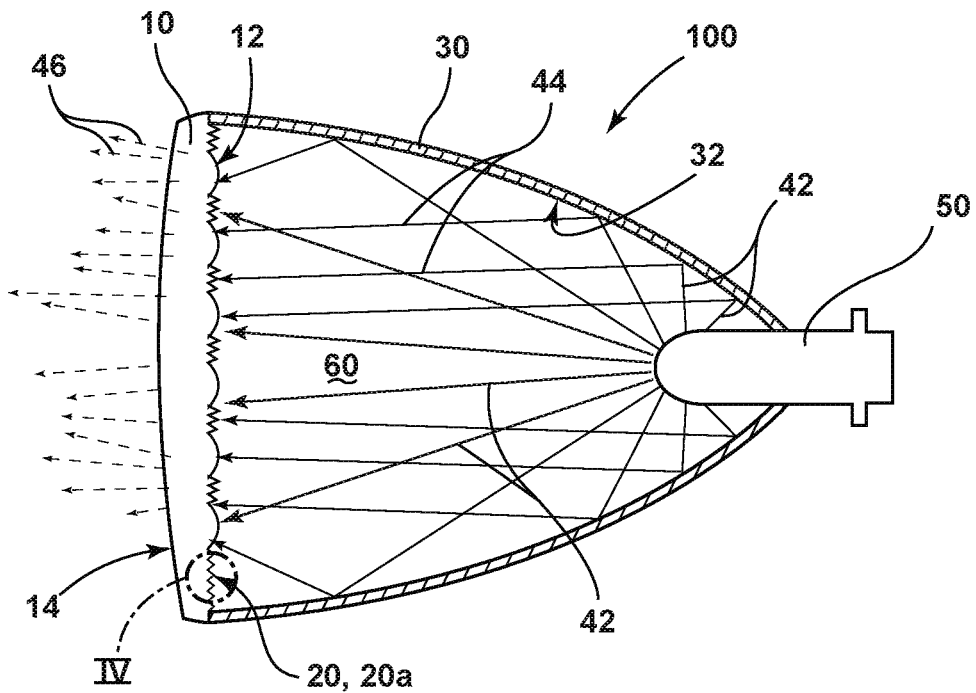
FIG. 3A is a cross-sectional, schematic view of the headlamp assembly depicted in FIG. 2A through line IIIA-IIIA with a fluted region integral with the lens element of the headlamp according to a further aspect of the disclosure.

Now referring to FIG. 3A, a headlamp assembly 100 according to an aspect of the disclosure is depicted in a cross-sectional, schematic view through a region of the assembly 100 that includes the fluted region 20. The headlamp assembly 100 includes a parabolic reflector 30 which includes an interior surface 32. The headlamp assembly 100 also includes a translucent lens element 10 with interior and exterior surfaces 12 and 14, respectively. Together, the reflector 30 and the lens element 10 define a chamber interior 60. As also shown in FIG. 3A, the headlamp assembly 100 includes a light source 50 that is configured to emanate incident light 42 that strikes the interior surface 32 of the parabolic reflector 30, resulting in reflected light 44 that exits the assembly 100 through the translucent lens element 10 as a light pattern 46.

The materials and compositions employed for the lens element 10 can include various materials, including polycarbonate, that are typically employed in automotive headlamp lens elements. The fluted regions 20 can also be fabricated from materials typically employed in headlamp assemblies. Preferably, however, the materials employed in the fluted region 20 have low viscosity such that they can flow into microscopic features of a mold configured to create the fluted region 20 in or on the lens element 10. To that end, materials are preferably selected for the lens element 10 that can be readily processed with or joined to high viscosity silicone, e.g., as within the fluted region 20.

The construction and materials for the parabolic reflector 30 are not particularly limiting in certain aspects of the disclosure; consequently, conventional constructions of this feature can be employed in the headlamp assembly 100 in many implementations. Nevertheless, certain implementations of the headlamp assembly 100 can employ an asymmetric parabolic reflector 30 with one or more non-parabolic or asymmetric regions that correspond to the fluted region 20 (not shown). In particular, these regions of the parabolic reflector 30 can be configured to further ensure that reflected light 44 from the incident light 42 originating from the light sources 50 is directed away from the fluted regions 20 within the chamber interior 60. Accordingly, the parabolic reflector 30 can also play a role in directing light from the headlamp assembly 100 away from oncoming vehicles in certain aspects of the disclosure.

Figure 3B:
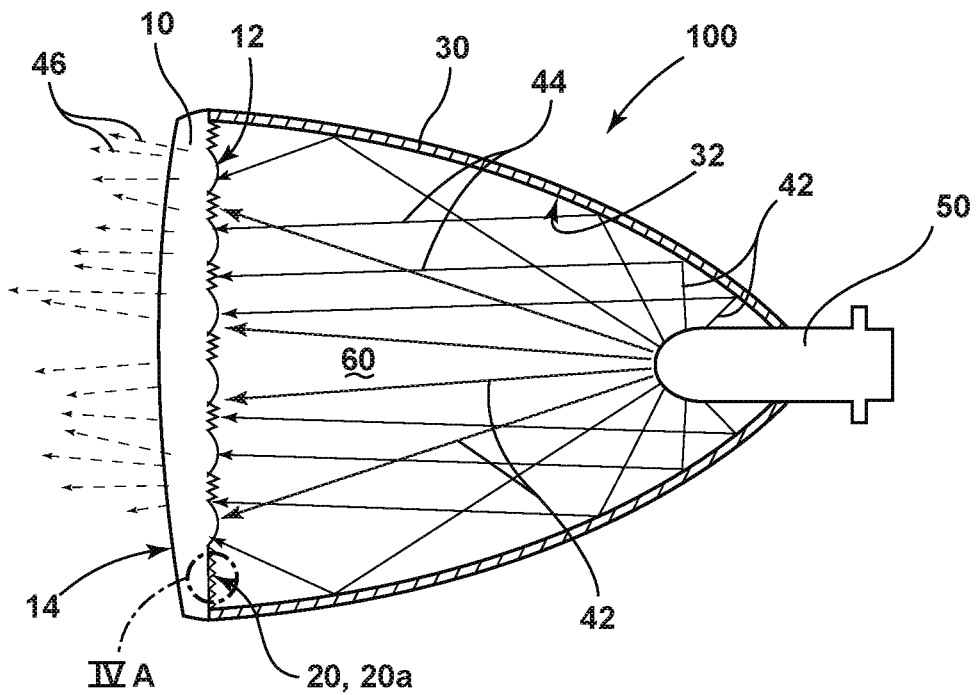
FIG. 3B is a cross-sectional, schematic view of the headlamp assembly depicted in FIG. 2A through line IIIB-IIIB with a fluted region as a layer on the lens element of the headlamp according to another aspect of the disclosure.

Referring to FIGS. 3A and 3B, the interior surface 12 of the translucent lens element 10 of the headlamp assembly 100 includes a fluted region 20 that is substantially invisible. In certain aspects, the fluted region 20 is integral within the interior surface 12 of the lens element (see FIG. 3A). In other aspects, the fluted region 20 can be configured as a layer, film or separate feature bonded or coupled to the interior surface 12 of the translucent lens element (see FIG. 3B). As also understood by those with skill in the operative field, the fluted region 20 can be configured within or on the exterior surface 14 of the lens element 10 (not shown), or otherwise within the lens element 10 itself between the interior and exterior surfaces 12, 14.

As also depicted in FIGS. 3A and 3B, the fluted region 20 is configured to refract or otherwise redirect reflected light 44 and incident light 42 (i.e., as originating from the light source 50) through the lens element 10 toward the appropriate regulated, geometric visibility zones (e.g., as set forth in FMVSS 108 and/or ECE 48), and thus prevent such light from passing through the lens element 10 toward oncoming vehicles or pedestrians. Put another way, the fluted region 20 is configured in a particular location on the lens element 10 to ensure that the light pattern 46 that exits the headlamp assembly 100 does not significantly impinge on oncoming vehicles and, more particularly, their drivers. At the same time, the fluted region 20 is configured to ensure that the light pattern 46 that exits the assembly 100 satisfies the requirements of the appropriate regulated, geometric visibility zones (e.g., as based on FMVSS 108 requirements for a low-beam headlamp pattern). In addition, the fluted region 20 can, in certain embodiments, be configured to prevent solar focus damage to components within the assembly 100 and/or components in proximity to the assembly 100 (e.g., bezels and other non-metallic elements not shown in the figures). Accordingly, the light pattern 46 that emanates from the headlamp assembly 100 does not contain the portion of the reflected light 44 and incident light 42 from the light source 50 that is refracted or otherwise obscured, refracted, or diffused by the fluted region 20.

As shown in FIGS. 3A and 3B, the headlamp assembly 100 includes a translucent, lens element 10. In some aspects, the lens element 10 is characterized by an optical transmissivity of 85% or more over the visible spectrum (e.g., 390 to 700 nm). Preferably, the lens element 10 is characterized by an optical transmissivity of 90% or more, and even more preferably, 95% or more, over the visible spectrum. Further, the lens element 10 can be optically clear with no substantial coloration. In other embodiments, the lens element 10 can be tinted or affixed with one or more filters on its interior surfaces 12 and/or exterior surfaces 14 to obtain a desired hue (e.g., blue, red, green, etc.).

Referring again to FIGS. 3A and 3B, interior and exterior surfaces 12, 14 of the lens element 10 of the headlamp assembly 100 include one or more fluted regions 20. As depicted in exemplary fashion in FIG. 3A, the headlamp assembly 100 includes a translucent lens element 10 with a fluted region 20 on a substantially planar portion of the interior surface 12. Additional fluted region(s) 20 can be located within the lens element 10 and/or on its exterior surface 14. Depending on the configuration and shape of the lens element 10, the fluted region(s) 20 can also be located on curved or other non-planar aspects of the lens element 10.

Figure 4:
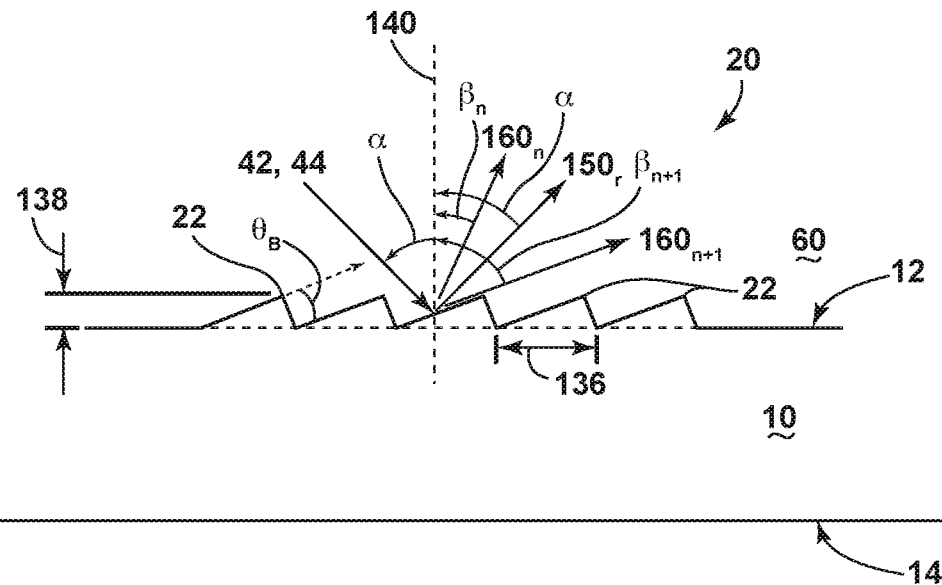
FIG. 4 is an enlarged view of a fluted region of the headlamp assemblies depicted in FIGS. 3A, 3B according to an aspect of the disclosure.

As shown schematically in FIG. 4 in cross-sectional form, the fluted regions 20 within or on the lens element 10 of the headlamp assembly 100 (see FIGS. 3A and 3B) are formed at a microscopic level. In an embodiment, the fluted region 20 (i.e., as inclusive of fluted regions 20 on or within interior and exterior surfaces 12, 14 of the lens element 10) have a thickness 138 that ranges from 100 nm to 1500 nm and, more preferably, from 250 nm to 1000 nm. The thickness 138 of the fluted region 20, for example, should be maintained in the range of 250 to 1000 nm to ensure that the headlamp assembly 100 (see FIGS. 2 and 2A) refracts or directs light from the sources 50 away from oncoming vehicles and pedestrians and toward the regulated, geometric visibility zones (e.g., as based on FMVSS 108 requirements for a low-beam headlamp pattern) while, at the same time, remaining invisible or substantially invisible as observed by those with a vantage point exterior to the headlamp assembly 100. In certain implementations, the thickness 138 of the fluted region 20 ranges from about 390 nm to 700 nm. In other embodiments, the thickness 138 of the fluted region 20 ranges from 500 nm to 750 nm. In still further embodiments, the geometry and/or location of the fluted regions 20 can be adjusted to ensure that solar light is redirected, de-focused or otherwise adjusted to prevent solar-related damage to non-metallic components of the assembly 100 or other such components in proximity to such assemblies (e.g., a bezel).

As also shown schematically in FIG. 4, the flutes 22 of the fluted region 20 within the lens element 10 of a headlamp assembly 100 can be configured in various shapes to diffract incident light 42 or reflected light 44 from vehicles by eliminating such light from the light pattern 46 that exits the headlamp assembly 100 through the lens element 10 (see FIGS. 3A and 3B). As depicted in FIG. 4 in exemplary form, the flutes 22 of the fluted region 20 can have a sawtooth or triangular shape. In three dimensions, the flutes 22 of the fluted region 20 can appear with a stepped or sawtooth shape without angular features (i.e., in the direction normal to what is depicted in FIG. 4), pyramidal in shape, or some combination of stepped and pyramidal shapes. Other shapes associated with the flutes 22 of the fluted region 20 include hill-shaped features (not shown)—e.g., stepped features with one or more curved features. The fluted region 20 can also include portions with a combination of triangular and hill-shaped features. More generally, the shapes of the flutes 22 of the fluted region 20 should be such that an effective blazing angle $\theta_B$ of at least 15 degrees is present for one or more portions of each flute 22, tooth or groove of the fluted region 20. The blaze angle $\theta_B$ is the angle between step normal (i.e., the direction normal to each flute 22, step or tooth of the fluted region 20) and the direction normal 140 to the interior and exterior surfaces 12, 14 of the lens element 10 having the fluted region 20. Generally, the blaze angle $\theta_B$ is optimized to maximize the efficiency of the wavelength(s) of the incident light 42 and/or reflected light 44, to ensure that various wavelengths of light are directed toward regulated, geometric visibility zones and obscured from oncoming vehicles and pedestrians. Similarly, the blaze angle can be optimized in certain embodiments to ensure that solar light that enters the assembly 100 is re-focused or otherwise redirected such that it does not damage non-metallic components of the assembly 100 or those in proximity to it.

As also shown schematically in FIG. 4, the fluted region 20 of the lens element 10 of a headlamp assembly 100 is characterized by one or more periods 136. In most aspects of the headlamp assembly 100 (see FIGS. 2 and 2A), the period 136 of the fluted region 20 is maintained between about 50 nm and about 5 microns. In general, the maximum wavelength that a given fluted region 20 can refract is equal to twice the period 136. Hence, a fluted region 20 with a period 136 that is maintained between about 50 nm and about 5 microns can refract light in an optical range of 100 nm to about 10 microns. In a preferred embodiment, the period 136 of a fluted region 20 is maintained from about 150 nm to about 400 nm, ensuring that the fluted region 20 can efficiently refract light in an optical range of about 300 nm to about 800 nm, roughly covering the visible spectrum.

Referring again to FIG. 4, a fluted region 20 along a portion of an interior surface 12 of a lens element 10 is depicted in exemplary form. Incident light 42 and reflected light 44 from the light source 50 and parabolic reflector 30 (see FIGS. 3A & 3B) at an incident angle α is directed against a sawtooth-shaped fluted region 20 having a thickness 138, a period 136 and a blaze angle $\theta_B$. More particularly, a portion of the incident light 42 and reflected light 44 striking the fluted region 20 at an incident angle α is reflected as reflected light 150$_r$, at the same angle α, and the remaining portion of the incident and reflected light 42, 44 is diffracted at particular wavelengths corresponding to diffracted light 160$_n$, 160$_{n+1}$, etc., at corresponding diffraction angles β$_n$, β$_{n+1}$, etc. The reflected light 150$_r$ is indicative of the zeroth order (i.e., n=0) and the diffracted light 160$_n$, 160$_{n+1}$, 160$_{n+2}$ are indicative of the nth order diffraction according to standard diffraction grating terminology, where n is an integer corresponding to particular wavelengths of the reflected or diffracted light.

Fluted regions 20, such as depicted in an enlarged, schematic format in FIG. 4, on or integral with the interior surface 12 of the lens element 10 (see FIGS. 3A & 3B), are advantageously located within the headlamp assembly 100. In particular, these fluted regions 20, as located within the chamber interior 60 of the headlamp assembly 100, are generally protected from damage, alteration and/or wear due to their location on the interior, backside of the lens element 10. Given that incident and reflected light 42, 44 need not pass through the lens element 10 to reach the fluted region 20 as configured on the interior surface 12 of the lens element 10, the diffraction efficiency of the fluted region 20 can be somewhat higher than the diffraction efficiency of a fluted region 20 located on the exterior surface 14 of the lens element (not shown) due to light absorption within the member 10. Further, fluted regions 20 located on the exterior surface 14 of the lens element 10 are more susceptible to damage, alteration and/or wear than fluted regions 20 on or within the interior surface 12 of the lens element 10. On the other hand, it is conceivable that fluted regions 20, on or within the exterior surface 14, may experience less light leakage toward oncoming vehicles in comparison to fluted regions 20 located on or within the interior surface 12 of the lens element. Accordingly, a preferred embodiment of the headlamp assembly 100 includes fluted regions 20 on the interior surface 12 of the lens element 10, but some configurations of the assembly 100 can benefit from configured fluted regions 20 on the exterior surface 14.

Figure 4A:
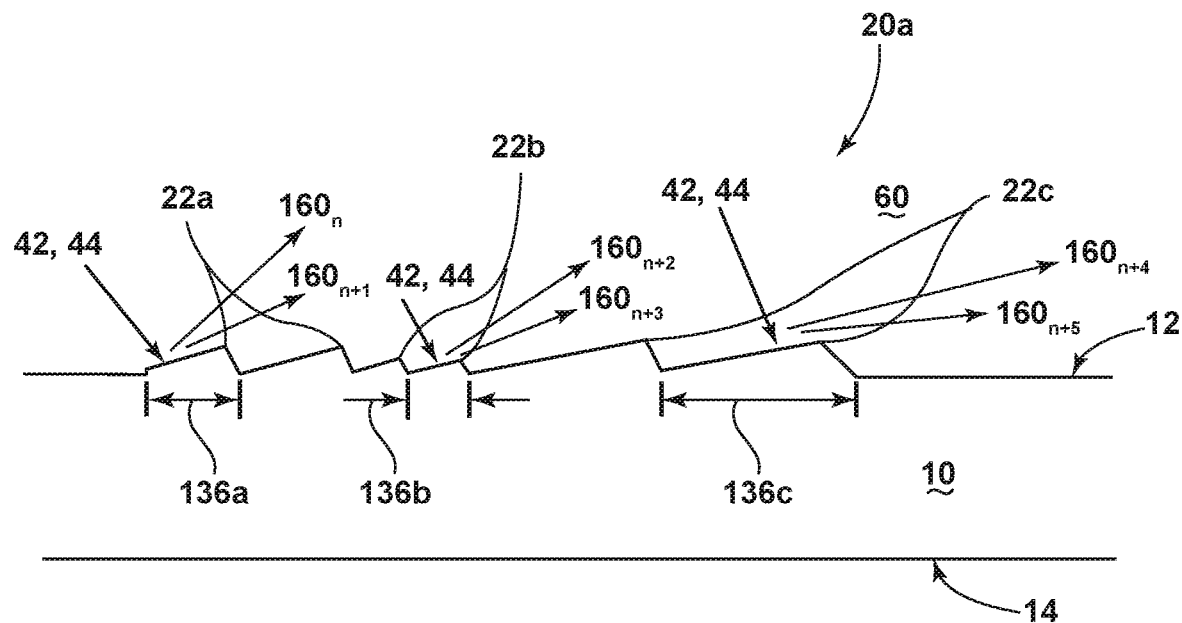
FIG. 4A is an enlarged view of a fluted region comprising a number of flutes arranged with a varying period and thickness according to a further aspect of the disclosure.

Referring now to FIG. 4A, a fluted region 20a with varying periods (e.g., as including a set of periods), that can be employed in vehicular headlamp assemblies 100 (or other headlamp assemblies consistent with the principles of the disclosure) is depicted in a cross-sectional form according to an aspect of the disclosure. The fluted region 20a is similar in most respects to the fluted regions 20 depicted in FIGS. 3A, 3B and 4, with like-numbered elements having the same structure and function. The fluted region 20a differs from fluted region 20 in that it contains varying periods for the flutes 22 within the same fluted region. In particular, fluted region 20a can have two or more sets of flutes, teeth or grooves, each having a particular period (e.g., period 136a) that can refract or otherwise obscure light at unique or differing diffraction orders. As shown in exemplary form in FIG. 4A, the fluted region 20a is configured with three periods—period 136a, period 136b and period 136c. One set of flutes 22a of the fluted region 20a with a period of 136a can produce diffracted light 160$_n$ and 160$_{n+1}$, a different set of flutes 22b with a period of 136b can produce diffracted light 160$_{n+2}$ and 160$_{n+3}$, and a third set of flutes 22c with a period of 136c can produce diffracted light 160$_{n+4}$ and 160$_{n+5}$, all from the same incident and reflected light 42, 44 from the light sources 50 (not shown) in the headlamp assembly 100. Consequently, a fluted region 20a, whether employed on interior and/or exterior surfaces 12, 14 (see also FIGS. 3A and 3B) of the lens element 10 advantageously can refract or otherwise obscure light with widely varying wavelengths within the chamber interior 60 of the headlamp assemblies 100 from striking oncoming vehicles.

In some aspects, the fluted region 20a depicted in FIG. 4A includes a varying period that varies between two to ten discrete values or, more preferably, between two to five discrete values. According to another aspect, a fluted region 20a with varying periods can be employed in one or more portions of an interior and/or exterior surface 12, 14 of a lens element 10 and one or more fluted regions 20 having a constant period are employed in other portions of the interior and/or exterior surface 12, 14 of the lens element 10 to ensure that all incident and reflected light 42, 44 from the light sources 50 within the headlamp assembly 100 is directed away from oncoming vehicles and toward regulated, geometric visibility zones (e.g., as mandated by FMVSS 108). Similarly, the fluted region 20a can be configured and/or positioned to ensure that solar light that enters the assembly 100 is re-focused or otherwise redirected such that it does not damage non-metallic components of the assembly 100 or those in proximity to it. In another embodiment, the fluted region 20a includes a varying period that changes between any number of values, only limited by the overall length of the fluted region 20a and/or the processing capabilities to develop such variability through precise control of mold dimensions.

Referring now to FIGS. 4 and 4A, certain embodiments of the fluted regions 20, 20a include one or more flutes 22. In general, the efficiency of the fluted regions 20, 20a in directing incident and reflected light 42, 44 (see also FIGS. 3A and 3B) away from oncoming vehicles can be improved with increasing numbers of flutes 22. Conversely, the size and number of the flutes 22 employed in the fluted regions 20, 20a can be limited to ensure that these fluted regions remain invisible or substantially invisible. In certain aspects, the number of flutes 22 within the fluted regions 20, 20a can range from about 10 flutes to 10,000 flutes. Preferably, the number of flutes ranges from about 25 flutes to about 5000 flutes. In certain preferred implementations, the number of flutes 22 employed in the fluted regions 20, 20a ranges from about 50 to about 2500 flutes.

According to another aspect of the disclosure, a method of making a headlamp lens element (e.g., a translucent lens element 10 as shown in FIGS. 3A and 3B) is provided. Such translucent lens elements can be employed in headlamp assemblies (e.g., headlamp assemblies 100 as shown in FIGS. 2, 2A, 3A & 3B) with invisible or substantially invisible fluted regions (e.g., fluted regions 20, 20a as shown in FIGS. 3A & 3B) according to the disclosure. One such exemplary method includes the steps: forming mold surfaces (not shown) corresponding to an interior surface of the lens element (e.g., interior surface 12 of the lens element 10); ablating one of the mold surfaces to form a fluted region mold surface (not shown) corresponding to a fluted region of the element (e.g., fluted region 20, 20a); and forming the element (e.g., translucent lens element 10) by dispensing polymeric material (e.g., polycarbonate, optically clear silicone, etc.) into the mold surfaces. As noted earlier, the fluted region made according to the method is substantially invisible and integral with the interior surface of the element.

According to such methods of making a headlamp lens element, the step of forming mold surfaces can be arranged to prepare mold surfaces that correspond to interior and exterior surfaces of the lens element (e.g., interior and exterior surfaces 12 and 14 of a translucent lens element as shown in FIGS. 3A & 3B). Preferably, a mold with mold surfaces is formed for this step from metals or metal alloys sufficient to withstand the temperatures and environmental conditions associated with injection molding the lens element suitable for vehicular headlamp assemblies. In a preferred embodiment, the forming mold surfaces step is conducted such that the mold is capable of injection molding a single piece lens element, e.g., translucent lens element 10.

The method of making a headlamp lens element according to the disclosure also includes a step of ablating at least one of the mold surfaces to form a fluted region mold surface that corresponds to a fluted region of the lens element (e.g., fluted region 20, 20a of the lens element 10 depicted in FIGS. 3A & 3B). For example, the ablating step can be conducted to form one or more such fluted region mold surfaces intended to correspond to fluted regions intended to be incorporated in portions of the interior and/or exterior surfaces of the lens element. In a preferred embodiment, the ablating step is conducted with a laser ablation process. Laser ablation processes, e.g., as employing an AgieCharmilles Laser P cutting apparatus from Georg Fischer Ltd., are particularly adept at developing the fluted region mold surfaces from the mold surfaces of the mold given their ability to precisely ablate microscopic features into metal and metal alloy mold surfaces.

Referring again to the method of making the headlamp lens element, it also includes a step of forming the element (e.g., lens element 10) by dispensing polymeric material (e.g., polycarbonate, optically clear silicone, etc.) into the mold surfaces to form the headlamp lens element with interior and exterior surfaces (e.g., interior and exterior surfaces 12, 14 of the lens element 10 depicted in FIGS. 3A & 3B) that correspond to the mold surfaces. Further, the step of forming the headlamp lens element can include forming a fluted region (e.g., fluted region 20, 20a as shown in FIGS. 3A & 3B) within or on the element having a thickness from 100 nm to 1500 nm, preferably between about 250 nm and 1000 nm, from the fluted region mold surfaces with a polymeric material (e.g., optically clear silicone with a high flow rate). Further, the step of forming the element can include forming the fluted region with a period from 50 nm to 5 microns from the fluted region mold surfaces.

Preferably, the forming the lens element step is conducted with an injection molding process in one or more steps. When conducted in one step, a two-shot mold can be employed to form the headlamp lens element with its interior and exterior surfaces from a typical headlamp lens material, e.g., polycarbonate. In the same mold, orifices in proximity to the fluted region mold surface can be injected with a lower viscosity material, e.g., optically clear silicone, to form the fluted region of the head lens element. In a preferred aspect, portions of the mold in proximity to the one or more fluted region mold surfaces are heated prior to the step of forming the lens element. Adding additional heat to these portions of the mold serves to further reduce the viscosity of the polymeric material such that it can flow within the very small scale aspects of the fluted region mold surfaces.

According to another aspect of the method of making the headlamp lens element, the step of forming the lens element step can include an insert-molding process for molding the fluted region. Such an insert-molding process to prepare the lens element can be conducted in two or more steps. For example, the headlamp lens element with its interior and exterior surfaces can be formed from a typical headlamp lens material, e.g., polycarbonate, in a first mold with mold surfaces that correspond to these interior and exterior surfaces of a lens element subassembly. The lens element assembly (i.e., without a fluted region) can then be removed and placed into a second mold that contains a fluted region mold surface. At this point, a polymeric material, e.g., optically clear silicon with a high flow rate, can be injected into the second mold adjacent to the lens element subassembly to form the fluted region over an interior and/or exterior surface of the lens element (e.g., lens element 20a as shown in FIG. 3B), depending on the desired configuration for the headlamp lens element. Alternatively, the first mold can be configured with a movable mold section with a fluted mold region surface that can be fitted against the lens element subassembly prior to the step of forming the fluted region. Upon configuring the first mold with the fluted mold region surface (e.g., by moving the movable mold section), a polymeric material can then be injected into the mold to form the fluted region over an interior or exterior surface of the lens element.

According to other aspects of the disclosure, the concepts of the foregoing vehicular headlamp assemblies 100 (and methods of making lens elements for such assemblies), can be applied to various vehicular lighting assemblies (e.g., low-beam headlamps, high-beam headlamps, turn signals, and parking signals). As readily understood by those with ordinary skill, other applications can benefit from the aspects of the disclosure related to obscuring, refracting, redirecting and/or diffusing output light patterns originating from vehicular lighting assemblies, and solar light entering such lighting assemblies, toward certain positions in proximity to these lighting assemblies, including regulated, geometric visibility zones and/or locations away from lighting assembly components susceptible to damage from solar light. For example, vehicular dome light assemblies can be configured with invisible or substantially invisible fluted regions according to the concepts of the disclosure that are configured to minimize or eliminate light from being directed toward the driver of the vehicle containing the dome light. As another example, headlamp assemblies with movable lens elements containing one or more fluted regions can be employed in vehicular applications requiring adjustments to the regions that require light blocking, glare reductions or the like. Such headlamp assemblies could be coupled to a controller with various sensor inputs configured to provide the controller with the appropriate information to adjust the movable lens element based on various situations requiring adjustments to the regions in need of light blocking. Vehicle-related situations necessitating such adjustments to the movable lens element might include: (a) the vehicle rounds a corner and approaches an oncoming vehicle; (b) the vehicle passes down a straight portion of a two-lane road and approaches an oncoming vehicle; and (c) the vehicle is in motion on a road without any oncoming vehicles in proximity to it.

Variations and modifications can be made to the aforementioned structure without departing from the concepts of the present invention. Such variations and modifications, and other embodiments understood by those with skill in the field within the scope of the disclosure, are intended to be covered by the following claims unless these claims by their language expressly state otherwise.

What is claimed is:

1. A method of making a vehicular lighting lens element, comprising:
   forming mold surfaces corresponding to an interior surface of the vehicular lighting lens element;
   ablating one of the mold surfaces to form a fluted region mold surface corresponding to a fluted region of the element; and forming the element by dispensing polymeric material into the mold surfaces, wherein the element comprises a substantially invisible fluted region comprising a plurality of flutes with a thickness from 250 to 1000 nm and a period from 0.05 to 5 microns configured to refract light from a light source away from oncoming vehicles.

2. The method according to claim 1, wherein the fluted region comprises a plurality of flutes having a thickness from 500 nm to 750 nm and a period from 150 nm to 400 nm.

3. The method according to claim 1, wherein the fluted region comprises flutes having a triangular- or hillock-shaped cross-section.

4. The method according to claim 1, wherein the lens element comprises a polycarbonate material and the fluted region comprises a silicone material.

5. The method according to claim 1, wherein at least one of the period and the thickness varies within the fluted region.

6. The method according to claim 1, wherein the plurality of flutes is at least 50 flutes.

7. The method according to claim 1, wherein the forming the lens element step comprises insert-molding the fluted region.

8. The method according to claim 1, further comprising:
heating the fluted region mold surface prior to the forming the lens element step.

9. The method according to claim 8, wherein the lens element comprises a polycarbonate material and the fluted region comprises a silicone material.

10. The method according to claim 1, wherein the ablating step comprises a laser ablation of one of the mold surfaces to form the fluted region mold surface.

11. A method of making a vehicular lighting lens element, comprising:
forming mold surfaces corresponding to an interior surface of the vehicular lighting lens element;
ablating one of the mold surfaces to form a fluted region mold surface corresponding to a fluted region of the element; and
forming the element by dispensing polymeric material into the mold surfaces, wherein the element comprises a plurality of integral and substantially invisible flutes having a thickness from 250 to 1000 nm and a period from 50 nm to 5 microns, and configured to refract light from the source away from oncoming vehicles.

12. The method according to claim 11, wherein the fluted region comprises a plurality of flutes having a thickness from 500 nm to 750 nm and a period from 150 nm to 400 nm.

13. The method according to claim 11, wherein the fluted region comprises flutes having a triangular- or hillock-shaped cross-section.

14. The method according to claim 11, wherein the lens element comprises a polycarbonate material and the fluted region comprises a silicone material.

15. The method according to claim 11, wherein at least one of the period and the thickness varies within the fluted region.

16. The method according to claim 11, wherein the plurality of flutes is at least 50 flutes.

17. The method according to claim 11, wherein the forming the lens element step comprises insert-molding the fluted region.

18. The method according to claim 11, further comprising:
heating the fluted region mold surface prior to the forming the lens element step.

19. The method according to claim 18, wherein the lens element comprises a polycarbonate material and the fluted region comprises a silicone material.

20. The method according to claim 11, wherein the ablating step comprises a laser ablation of one of the mold surfaces to form the fluted region mold surface.

* * * * *